Aug. 7, 1928.
C. N. BERGMANN
1,680,199
CAPPING MECHANISM
Original Filed Jan. 17, 1923   3 Sheets-Sheet 1
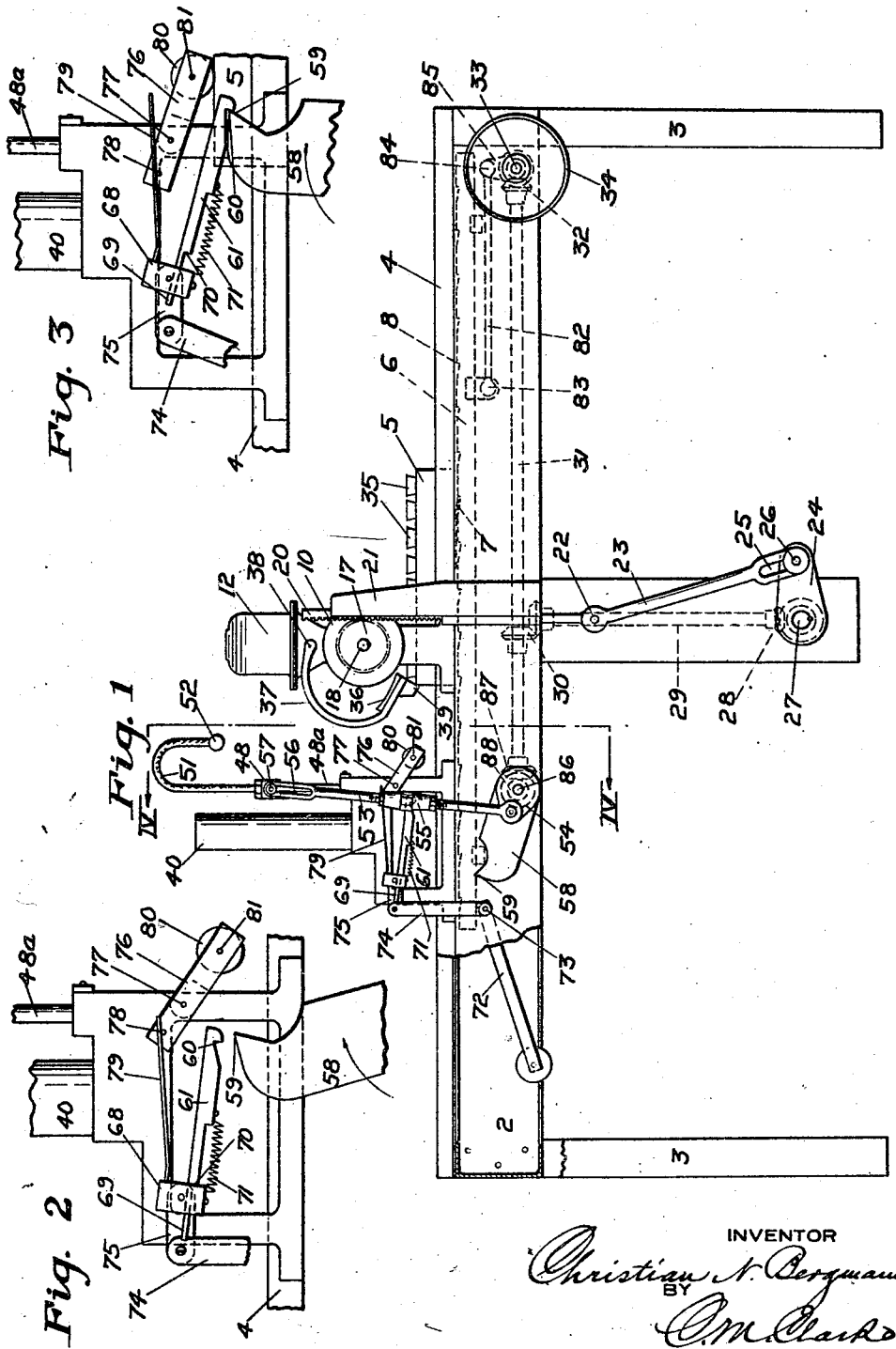

Aug. 7, 1928.                                              1,680,199
C. N. BERGMANN
CAPPING MECHANISM
Original Filed Jan. 17, 1923      3 Sheets-Sheet 2

INVENTOR
Christian N. Bergmann
BY
C. M. Clarke
ATTORNEY

Aug. 7, 1928.
C. N. BERGMANN
1,680,199
CAPPING MECHANISM
Original Filed Jan. 17, 1923   3 Sheets-Sheet 3
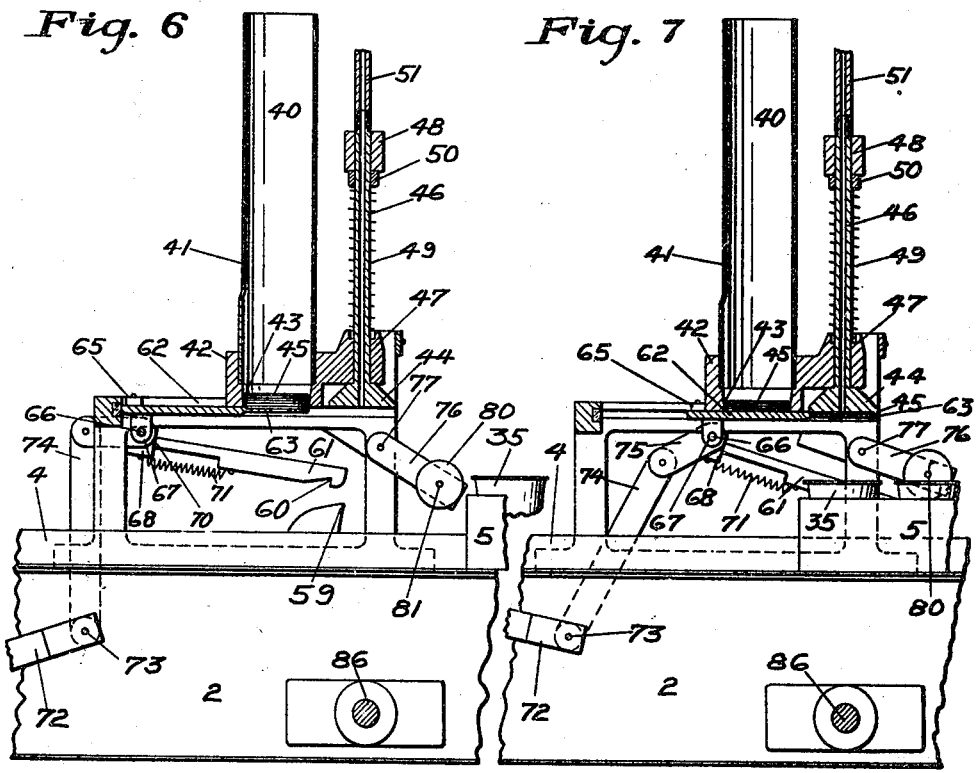
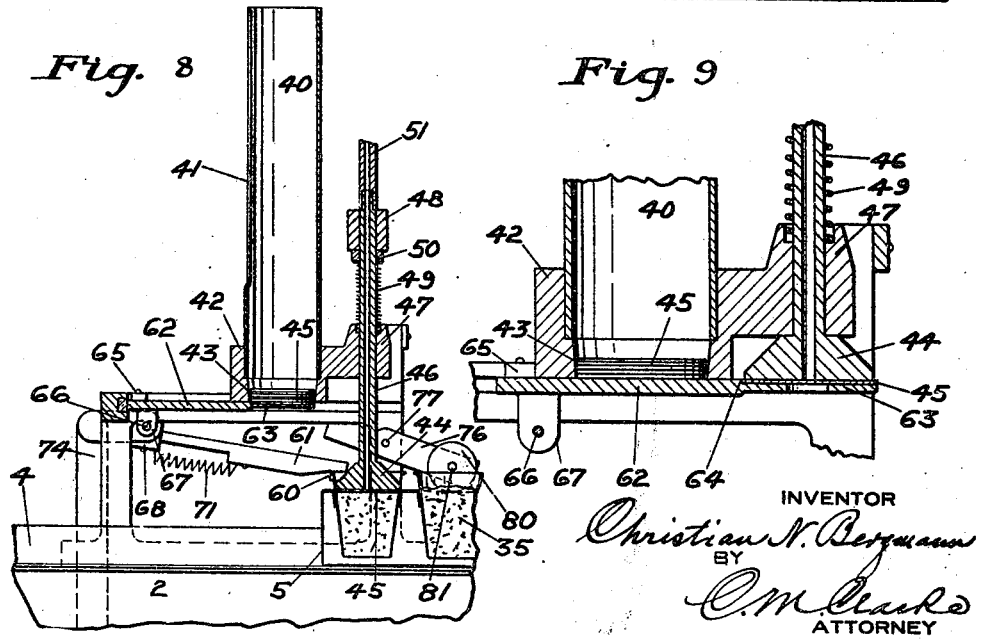

Patented Aug. 7, 1928.

1,680,199

UNITED STATES PATENT OFFICE.

CHRISTIAN N. BERGMANN, OF PITTSBURGH, PENNSYLVANIA, ASSIGNOR TO BERGMANN PACKAGING MACHINE COMPANY, OF PITTSBURGH, PENNSYLVANIA, A CORPORATION OF DELAWARE.

CAPPING MECHANISM.

Original application filed January 17, 1923, Serial No. 613,235. Divided and this application filed January 19, 1923. Serial No. 613,595.

My invention relates to improvements in capping mechanism for receptacles or containers, as cartons, cups, etc., after filling, in the manner more fully hereinafter described. More particularly, the machine utilizing the capping mechanism is adapted to fill containing cups or cartons with ice cream or other suitable material, for the purpose of vending or storing the same in package form, in a simple, economical, efficient and expeditious manner.

The machine utilizes one or more continuous series of carrying trays, arranged to hold the receptacles and successively present them in proper position to be filled and sealed, a supporting trackway therefor, and means for advancing the tray and receptacles successively through the machine for filling and closing. The capping mechanism for applying a sealing cover is controlled and operated by the tray so as to ensure proper positioning of the parts throughout the operation.

The machine is so constructed and arranged that one tray after another, filled with empty receptacles, will pass through it, and the receptacles will be filled and closed, the tray then passing outwardly at the other end, where it may be removed with its filled contents, ready for use.

The improvement herein involved relates particularly to the means for applying the covers to the receptacles, and the subject matter of this application is a division of my former application filed January 17, 1923, Serial No. 613,235.

In the drawings, illustrating the invention as used in connection with one form of filling machine, Fig. 1 is a view of the machine in side elevation, partly broken away;

Fig. 2 is an enlarged detail view in side elevation of the actuating mechanism for shifting the sealing disks;

Fig. 3 is a similar detail view showing the actuating mechanism advanced;

Fig. 6 is a longitudinal vertical section on the line VI—VI of Fig. 4, showing the disk magazine and pneumatic disk-placing mechanism;

Fig. 7 is a similar view, showing the sealing disk in its shifted position and in register with the pneumatic plunger;

Fig. 8 is a similar view, showing the operation of placing the disk cover in the receptacle; and Fig. 9 is a partial similar view, enlarged.

Figure 4:
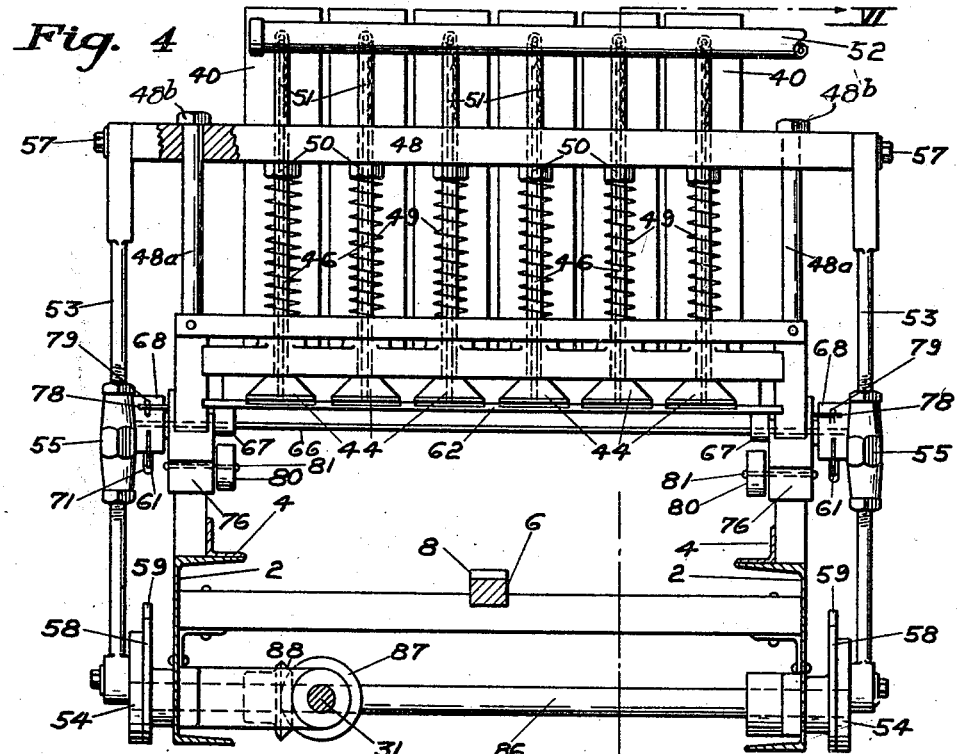
Fig. 4 is an enlarged cross sectional view on the line IV—IV of Fig. 1.
Figure 5:
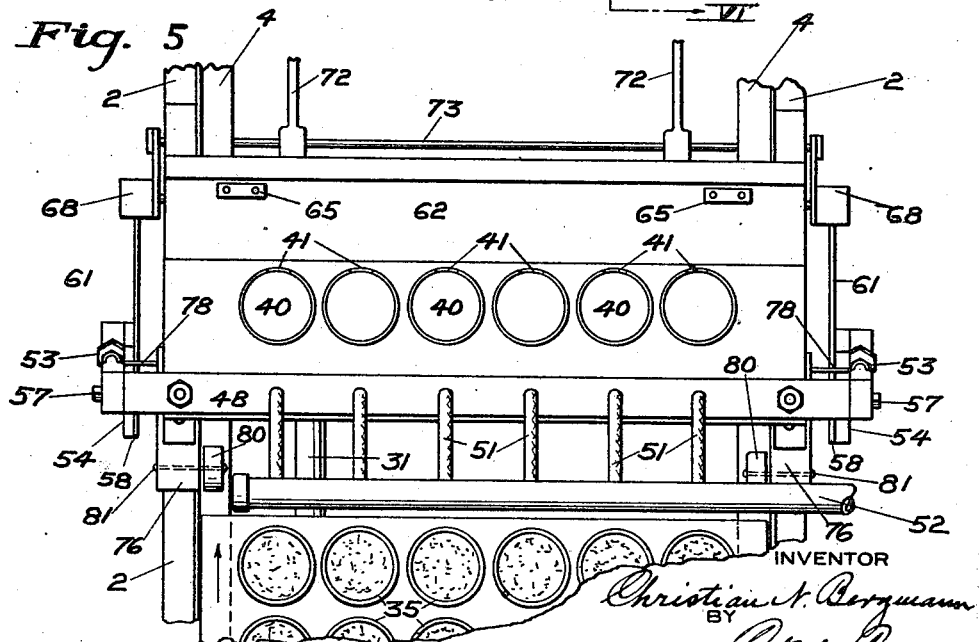
Fig. 5 is a partial plan view, showing the receptacle tray passing underneath the cover applying mechanism.

While the present improvement relates particularly to the cover applying mechanism, I will describe the whole of the operative mechanism so that the entire construction and operation will be understood.

The machine as a whole is generally rectangular in form, having a horizontal supporting frame 2 of any suitable material, as structural shapes, supported by the legs 3—3. Extending upwardly from such main frame at each side of its length are suitable trackways 4 of angle iron or other appropriate shape, for sliding support of the receptacle carrying frame or tray 5. The latter is adapted to be advanced intermittently along such trackway by the reciprocating bar 6 and engagement thereby of the pawl 7 secured on the under side of the receptacle frame 5. Said pawl may be made of spring steel, and is adapted to be successively engaged by one of a series of shoulders 8 of bar 6, at the proper time to push the cup receptacle carrier or tray forward one space. The shoulders 8 are equally spaced so as to ensure accuracy in the periodical intermittent movement of the carrier, or a series of them, by the regularity of motion imparted by bar 6.

The carrier 5 is provided with suitable receiving cavities extending crosswise of its width, in rows, spaced apart longitudinally of the carrier a distance equaling each forward intermittent movement, whereby to bring each successive row of receptacles underneath the unit measuring mechanism.

The latter, which is of the same general construction and operation as that shown and described in my prior application above referred to, comprises a rotary barrel mounted within a cylindrical casing 10, below the delivery portion of a main hopper 12.

For the purpose of imparting alternating forward and back half rotation to the barrel, it is provided with a pinion 17 secured to one end of supporting shaft 18, carried by bearings at each end of the hopper mechanism, which pinion is in constant mesh engagement with the teeth of reciprocating rack 20. Said rack is slidably mounted in a suitable vertically arranged housing 21 and is pivotally connected at 22 with the pitman 23 having operative connection with the constantly rotating crank 24. Pitman 23 is provided with a slotted link terminal 25 for desired lost motion connection with the crank pin 26 of crank 24, whereby to provide for a temporary period of inertia of the measuring barrel during the filling and emptying of the cavities thereof. Crank 24 is secured to the end of constantly rotating shaft 27 which is geared by bevel gearing 28 with shaft 29 extending upwardly therefrom. Shaft 29 in turn is geared by bevel gearing 30 with shaft 31 extending longitudinally of the machine, and geared by bevels 32 with the main power shaft 33 having a driving pulley 34, for connection with any source of power, as will be readily understood.

The movement of said shaft is comparatively slow and the operation of crank 24 is sufficiently gradual to provide for a comparatively long period of rest for the measuring barrel and comparatively quick rotation of it to reversed position, as clearly described in the prior application.

The contents of the main reservoir are delivered in measured unit form from the lower portion of the barrel, while each cavity is at the same time receiving the next charge from its upper portion, after the previously measured units have been discharged into the transverse series of receptacles 35.

For the purpose of providing a sealing closure for the outlet apertures at the under side of casing 10, when the machine is not in operation, a closing valve or gate 36 extends across and between the supporting arms 37 which are pivoted at 38 to each end of the main hopper. Depending downwardly from one or both of such arms is an abutment or lug 39 extending into the path of the receptacle carrier 5, and adapted to be engaged thereby as the carrier is progressed underneath the filling mechanism, thereby forcing the gate valve into open position just at the time the receptacles are directly under the measuring cavities and in a position to receive the material as it is being discharged.

Beyond the filling mechanism is the covering or capping device for the purpose of placing a series of closing disks of pasteboard or the like into each successive row of filled receptacles as they are successively advanced along, and during their temporary stoppage. For such purpose, I provide a series of vertically arranged tubular magazines 40 mounted above the carrier space, across the machine. Each of such magazines, which may be of thin tubular metal, is preferably vertically slotted, as at 41, providing clearance for access to the disks, and mounted at its bottom in a supporting base 42 provided with an interiorly flush delivery opening 43 preferably slightly tapered, as indicated in Figs. 6, 7, 8, and 9.

Between said magazines and the filling mechanism, is a corresponding series of disk placing plungers 44, the purpose of which is to receive and temporarily hold a series of sealing disks 45 upwardly against their bottoms by pneumatic suction, and to then place them in tight frictional engagement within the interior of each receptacle or cup 35, tightly sealing the contents. The disk plungers 44 are provided with upwardly extending hollow guide stems 46, slidably mounted in guide extensions 47 and all connected at their tops with a common cross head or bar 48 by which they are reciprocated vertically. Each hollow stem 46 is provided with a spiral lifting spring 49 bearing up underneath a securing nut 50, by which the several stems are fixedly held in operative relation to the cross bar 48. The cross bar 48 and the several stems are retracted by the springs 49 to their highest position after being lowered. The cross bar 48 is maintained for vertical movement by guide pins 48$^a$ extending upwardly from the frame, having terminal limiting nuts or abutments 48$^b$.

For the purpose of creating suction and sufficient partial vacuum to positively hold the several disks 45 in proper position underneath the several plungers 44, the top of each hollow stem 46 is connected by a tubular flexible hose section 51 with a common suction pipe 52 communicating with a pump, vacuum tank, or other suction or vacuum creating mechanism. The several plungers are intermittently reciprocated, by their common cross bar 48, through connecting rods 53 and continuously moving cranks 54 at each side of the machine. Connecting rods 53 are preferably provided with adjustable turn buckles 55 at their middle portion, providing for adjustment of the stroke of the plungers. The upper portion of each connecting rod is slotted, as at 56, for the purpose of providing for lost motion connection with the terminal bolts or pins 57 of the cross bar.

A crank arm extension 58 is provided with a finger terminal 59 adapted to engage the abutment 60 of arm 61, for the purpose of discharging the lowermost of the series or bank of disks 45 from each magazine top. This operation is effective through the reciprocation of slide 62 mounted immediately below the series of magazines and having the front cover supporting shelf extension 63 provided with a shoulder or abutment 64 adapted to engage and push out the lowermost of each of said series of disks, and to carry them forward into a central registering position with each of the several plungers 44, as clearly shown in Fig. 7.

The forward movement of slide 62 is positively limited by abutment 65 engaging against the base 42. A shaft 66 engages depending lugs 67 of the slide 62 and extends beyond them at each side and is provided with the pivoting pull blocks 68, which impart movement to the slide.

Arm 61 is slidably mounted in each block 68 by its reduced terminal 69 extending beyond the arresting shoulder 70, and is normally held retracted by the spring 71 attached by its opposite ends to the block and arm respectively. When the terminal finger 59 engages hooked terminal 60, as arm 58 revolves at each side, the springs 71 are sufficiently strong to draw the blocks 68 forward at each side until abutment 65 makes contact. Arms 61 then move slightly beyond the blocks by their slide extensions 69 until fingers 59 have become disengaged from hooks 60, when they will be retracted by the springs. (See Fig. 3.) As crank arm 58 revolves, its terminal 59 will be disengaged from hook 60 by the cam action of the rear upper rounded portion of the arm bearing underneath the lower edge of arms 61 behind the hook.

Reverse movement of slide 62 is effected by counterweighted arms 72 of rock shaft 73 having crank arms 74 connected by links 75 with shaft 66. When fingers 59 wipe beyond hooks 60, releasing pulling force on blocks 68, the counterweighted arms 72 which have been raised by the forward movement of the slide, will retract it by gravity.

Arms 61 and their hooked terminals are normally held up out of the way of rotating arms 58 in an inoperative position until the receptacle carrier 5 has advanced to bring the first row of filled receptacles 35 underneath the transverse row of plungers 44.

For the purpose of thus holding arms 61 raised until such time, so as to render the slide 62 operative only after the row of receptacles has reached such point, I provide at each side the levers 76. These are pivoted to each side of the frame at 77, and have a pin or abutment 78 extending out underneath the lifting rod or arm 79 of each block 68. The other end of the lever 76 acts as a counterweight to normally hold the opposite end of the lever carrying abutment 78 raised, as in Fig. 2, and is provided with a bearing roller 80. The latter is pivoted at 81 at the inner side of each lever 76, in range of the receptacle carrier or tray 5, so as to be lifted thereby. As the carrier advances and rides underneath rollers 80, lifting them by its side edges, the upper end of each lever 76 is correspondingly lowered, allowing arms 79 and blocks 68 to tilt downwardly sufficiently far to bring the hooked terminal 60 of the arm 61 in range of the finger terminal 59 of lever 58, as in Fig. 3. Such operative position of these parts will continue as long as the carrier 5 is in lifting engagement with rollers 80, during which time the carrier is successively advanced for placement of the closing disks in the successive rows of filled receptacles.

Thereafter, the carrier or tray will pass outwardly toward the other end where it may be removed, rollers 80 dropping down behind the carrier and lifting arms 79 and 61 to inoperative position until the next carrier is brought into range of the cover applying mechanism.

The intermittent actuation of the carriers by shouldered bar 6 is effected through the intermittent reciprocation of such bar by the pitman 82 pivoted to the bar or a lug extension thereof at 83 and similarly connected at 84 with crank 85 of shaft 33.

Cranks 54 and 58 are secured to the outer ends of shaft 86 which is geared by bevels 87—88 with shaft 31, the speed of said shafts and of their connected parts being timed to correspond to the co-acting filling mechanism actuated through bevels 30 from the same shaft for driving shaft 27 and its connected parts, as will be readily understood. The speed of the several parts of the machine will, of course, be suitably regulated to the work in view, dependent somewhat upon the material being charged into the receptacles and other conditions present.

The several parts as arranged may be varied and the dimensions and capacity of the machine may, of course, be changed to suit the desired capacity and output, and the invention is not, of course, to be limited to the exact construction, arrangement or number of such parts, but may be variously changed or modified by the skilled mechanic, as will be readily understood.

The construction of the machine and its manner of operation will be clear from the foregoing description. A carrier with its receptacles being placed upon the supporting tracks 4, the carrier will be progressed along underneath the filling mechanism, each row of receptacles being filled in the manner described, and then covered by the closing disks at the subsequent position, the carrier continuing by its intermittent movements through the machine and beyond the cover applying mechanism, to the other end, where it may be removed.

It will be seen also that a series of closely adjacent carriers may be passed through the machine one after the other, so that no time or space is wasted in securing the maximum capacity and output. The machine is well adapted to the filling of receptacles, cups, or cartons of the kind disclosed, for the purpose of vending or storing mobile material, as ice cream, etc., the receptacles themselves and their closing disks being preferably of paper or the like.

The tight closing of the containers, due to the regularity and accuracy of the cover placing mechanism, ensures uniformly tight fitting of the tops, so that the packages may be handled, shipped, or stored without danger of leakage.

What I claim is:

1. In combination with a cover magazine and a laterally arranged plunger, a reciprocable shouldered bottom slide adapted to shift a bottom cover from the base of the magazine to registering position with the plunger, a hooked arm having lost motion connection with the slide, means suspending said arm in inoperative position, and means for engaging said arm to actuate the slide when the arm is lowered.

2. In combination with a cover magazine and a laterally arranged plunger, a reciprocable shouldered bottom slide adapted to shift a bottom cover from the base of the magazine to registering position with the plunger, a hooked arm having lost motion connection with the slide, means suspending said arm in inoperative position, and a crank arm having operative connection with the plunger for reciprocation thereof and provided with a terminal adapted to engage the hooked arm.

3. In combination with the reciprocable slide of a cover magazine and a cooperating plunger, a block pivotally connected with the plunger provided with a slidable shouldered arm having a hooked terminal and a retracting spring, means for raising and lowering said arm to inoperative and operative positions respectively, and a crank arm having operative connection with the plunger for reciprocation thereof and provided with a terminal adapted to engage the hooked arm.

4. In combination with the reciprocable slide of a cover magazine and a cooperating plunger, a block pivotally connected with the plunger provided with a slidable shouldered arm having a hooked terminal and a retracting spring, a lifting rod extending from said block, a counter-weighted lever engaging said rod and provided with a roller for engagement with a carrier frame, and a crank arm having operative connection with the plunger for reciprocation thereof and provided with a terminal adapted to engage the hooked arm.

5. In combination with the reciprocable slide of a cover magazine and a cooperating plunger, a block pivotally connected with the plunger provided with a slidable shouldered arm having a hooked terminal and a retracting spring, a lifting rod extending from said block, a counter-weighted lever engaging said rod and provided with a roller for engagement with a carrier frame, a counter-weighted lever operatively connected with the slide for retracting it, and a crank arm having operative connection with the plunger for reciprocation thereof and provided with a terminal adapted to engage the hooked arm.

6. In combination with a transverse series of plungers each having a hollow stem and a lifting spring, a cross arm fixedly engaging said stems, operating cranks provided with connecting rods having slotted connection with the cross arm at each end for actuation thereof on downward motion and alternating rest period lost motion on upward movement, a suction header having flexible hose connection with the upper end of each hollow stem, a movable carrier adapted to place open top receptacles underneath the plungers, means for locating cover disks between the receptacles and the plungers, and means adapted to be engaged by the carrier for regulating the operation of the disk locating means.

7. In a package capping machine, the combination of a supporting frame having a longitudinal trackway, an intermittently movable package carrier thereon having pockets for open top packages, a superimposed cover magazine, means for selecting a cover therefrom, means for placing it within one of said packages, means for actuating the carrier and said cover placing means, and means adapted to be engaged by the carrier for regulating the operation of the cover selecting means.

In testimony whereof I hereunto affix my signature.

CHRISTIAN N. BERGMANN.